July 17, 1962 M. D. PROSCHOLD 3,044,097

MEANS FOR CLEANING AND PACKAGING PHONOGRAPH DISC RECORDS

Filed Feb. 6, 1961

INVENTOR.

Marvyn D. Proschold

BY Philip A. Friedell

Attorney

United States Patent Office 3,044,097

Patented July 17, 1962

3,044,097

MEANS FOR CLEANING AND PACKAGING PHONOGRAPH DISC RECORDS

Mervyn D. Proschold, P.O. Box 93, Cazadero, Calif.

Filed Feb. 6, 1961, Ser. No. 87,324
6 Claims. (Cl. 15—268)

This invention relates to improvements in means for cleaning phonograph disc records and returning the cleaned records to their containers without hand handling for full protection against finger marks or other deleterious matter, to insure the most perfect reproduction of the recordings. The invention also constitutes a most excellent display device for recordings, for merchandising.

As is well known, high fidelity and stereophonic recordings are extremely sensitive to foreign matter, particularly to finger prints, therefore records can manually be safely handled only peripherally, under which conditions cleaning proves difficult coupled with a good prospect of marring, scoring, or even breaking the record during the operation, or if the record is laid on a flat surface, probable marring of the underface.

My invention provides a device which will suitably support the record and permit its inversion for enabling cleaning of both faces, and deposit it in its container without being touched by fingers or hand, assuring a perfectly clean record for highest fidelity reproduction. Special materials, such as cloths are available from record supply houses, for cleaning the records.

The objects and advantages of the invention are as follows:

First, to provide apparatus for securely holding a record for cleaning.

Second, to provide apparatus as outlined in which the record is reversible for enabling selective cleaning of the respective faces of the record.

Third, to provide apparatus as outlined with retaining means for the record container for holding the container in a position for direct discharge of the record thereinto upon release to avoid the application of finger marks to the cleaned record.

Fourth, to provide apparatus as outlined which can be assembled and disassembled at will without recourse to tools or other apparatus, and which provides for flat packaging or storage in a minimum of space.

Fifth, to provide apparatus as outlined which is very simple in construction and economical to manufacture.

In describing the invention reference will be had to the accompanying drawings, in which.

Figures 1, 2, 3, 4, 5, 6:
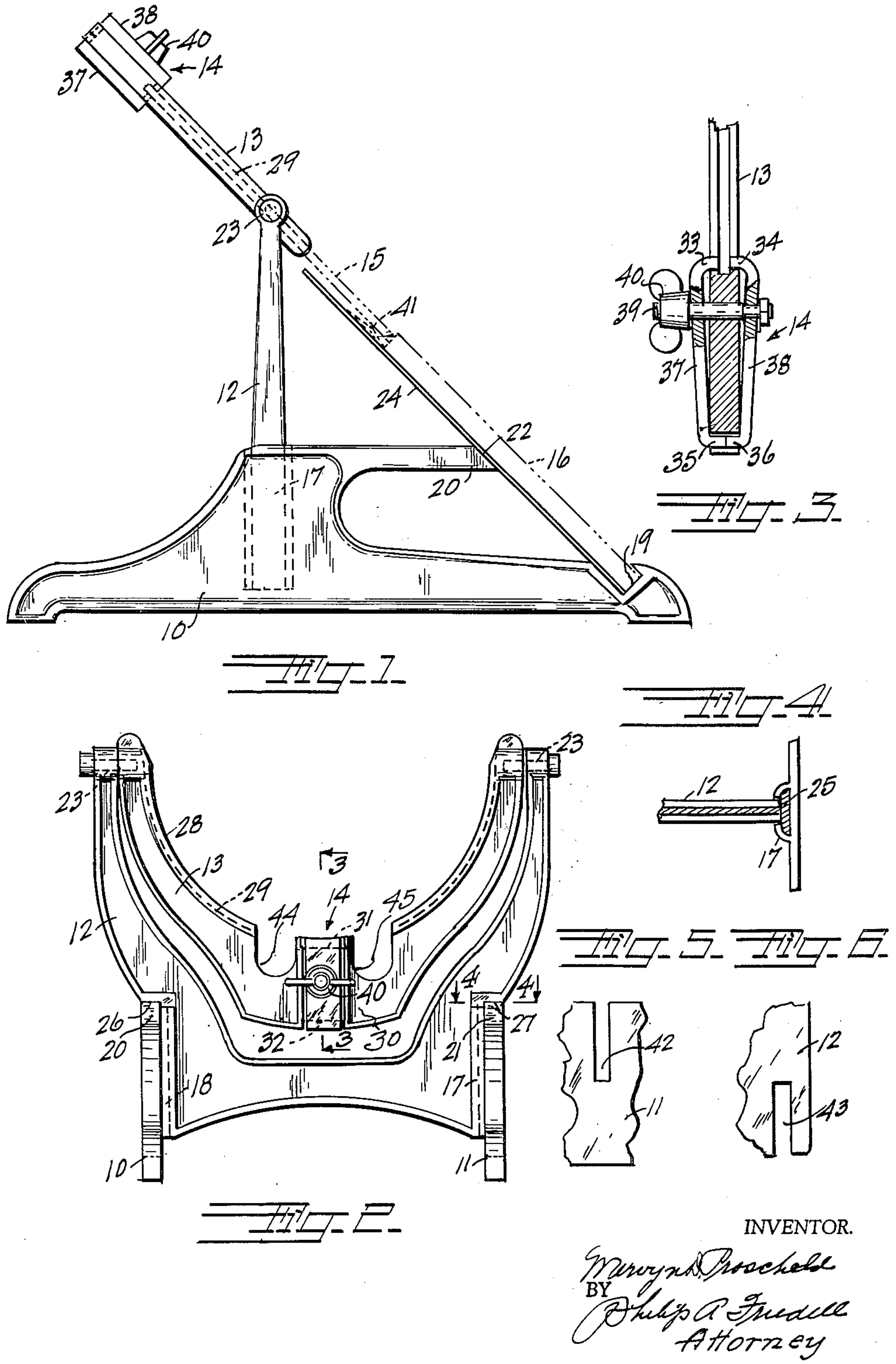
FIG. 1 is a side elevation of the invention with the record and container in position for direct discharge of the record into the container following the cleaning operation.
FIG. 2 is a front elevation of the invention.
FIG. 3 is a fragmentary sectional elevation taken on line 3—3 of FIG. 2, showing the securing means for the record.
FIG. 4 is a section taken on line 4—4 of FIG. 2.
FIGS. 5 and 6 illustrate another method of releasably securing the apparatus in assembled form.

The invention includes a suitable support such as the feet 10 and 11, a frame 12 which is releasably secured to the feet, and a record holder 13 which is pivoted in the frame and includes clamping means 14 for releasably securing a record 15 in the record holder, and means for supporting a container 16 in alignment with the transverse axis of the record holder.

This invention may be formed of any suitable rigid material such as wood, metal, or plastic, and is shown as formed of molded plastic or metal.

The feet are provided with vertical T-slots 17 and 18 on the inner faces and have a greater forward extension than rearward to provide for the supporting means such as the transverse grooves 19 formed in the upper surface of the foot, and the arms 20 and 21 which project from the upper ends of the feet, with the undersurface of the groove and the front edge 22 of the arms being substantially in alignment with the under edge of the pivot 23, to support the container 16 centrally in alignment with the pivot for aligned discharge of the record 15 into the container. A guide plate 24 may be rested in the groove and against the ends of the arms to insure direct delivery into the container and prevent accidental fall of the record.

The frame 12 is provided with T-shaped ends as indicated at 25 in FIG. 4, to slidably fit in the T-slots 17 and 18, and is provided with shoulders 26 and 27 to rest on the tops of the feet. This frame in internally substantially U-shaped to receive the record holder 12. The record holder is internally substantially semi-circular as indicated at 28, this recess being slightly smaller in diameter than the record. An annular groove is formed in the inner edge to receive the peripheral edge of the record. This record holder is axially pivoted in the frame as indicated at 23, the pivots being frictionally held in the frame and rotatable in the record holder, and are therefore removable at will.

A combination handhold and clamp is provided at the lower end of the record holder the lower end of which is broadened as indicated at 30 and which lower end is relieved at both, top and bottom as indicated at 31 and 32, to receive the inturned jaws 33 and 34, and fulcrums 35 and 36, to maintain the clamp jaws in proper alignment, the jaws being shown as being clamped by a thumb nut 40 on a screw 39.

As is readily apparent, the record holder is reversible for enabling cleaning the respective faces of the record. When the cleaning operation is completed, the guide plate 24, which may be formed of any suitable relatively rigid material, may be placed in the groove 19, and the container 16 rested thereon, the record holder rotated to the position shown and the clamp released to free the record and permit it to slide into the container, free of finger marks.

For wood construction, the connections shown in FIGS. 5 and 6 may prove more economical to make, the foot 11 having a depending slot 42 formed downwardly from the top, and the frame 12 having an upwardly formed slot 43 formed from the bottom edge on each side, thus providing a rigid connection when coupled together.

Since there is a possibility that the records may not always free themselves for discharge into the container, a finger receiving recess is formed downwardly on each side of the clamp portion as indicated at 44 and 45 so that the fingers can be used to urge the record out of the recess, and, simultaneously, the lower portion of the slot is eliminated so there can be no accumulation of foreign matter, and in which zone it would naturally accumulate.

I claim:

1. Phonographic disc record cleaning and packaging apparatus comprising a frame, a record holder internally semicircularly formed and having an annular recess formed and having an annular recess formed therein to receive one-half of the peripheral edge of the record and including manually operable clamping means engageable over an intermediate portion of said one-half of the peripheral edge for releasably securing the record therein, with the record holder pivotally mounted in said frame and swingable to reverse positions for enabling cleaning of the respective faces of the record, and supporting means for said frame.

2. Phonograph disc record holding and packaging apparatus comprising a frame, a record holder internally semicircularly formed and having an annular recess formed therein to receive the peripheral edge of the record, and including means for releasably securing the record therein, with the record holder swingable to positions for enabling cleaning of the respective faces of the record, and supporting means for said frame, support means for supporting a container for the record in a plane coincident with the plane of the record holder and in receptive position for the record when the record holder is inverted and in a predetermined angular position, whereby release of the means for releasably securing permits the record to slide into the container.

3. Phonographic disc record cleaning and packaging apparatus comprising a frame, supporting feet detachably connected to said frame, said frame being internally substantially yoke shaped, a record holder internally semicircularly formed to a diameter slightly less than the diameter of the record to be held and having an annular recess formed therein to receive the semiperiphery of the record, and including manually operable clamping means engageable with a mid portion of the semi-periphery of the record, said record holder being diametrically pivoted in said frame and thereby reversely swingable to positions for enabling cleaning of the respective faces of the record.

4. Phonograph disc record holding and packaging apparatus comprising a frame, supporting feet detachably connected to said frame, said frame being internally substantially yoke shaped, a record holder internally semicircularly formed to a diameter slightly less than the diameter of the record to be held and having an annular recess equal in diameter to the record, and including clamping means for the periphery of the record, said record holder being diametrically pivoted in said frame and swingable to positions for enabling cleaning of the respective faces of the record, packaging means comprising supporting means for supporting a container in angular alignment with the diametric pivoting of the record holder in the frame and including supports for the lower end and intermediate portions of the container, with the supports for the lower end being spaced substantially equal to one and one-half times the diameter of the record from the axis of the diametric pivoting, whereby the record may be discharged into the container by aligning the record holder with the container and releasing the clamping means for releasing the record.

5. A structure as defined in claim 4, a plate supportable on said supporting means for the container and extending upwardly in slightly spaced relation to the pivotal connection between the record holder and the frame, to prevent drop of the upper end of the record as it moves out of the annular recess.

6. A structure as defined in claim 4, said supporting means comprising a plate, recesses formed in the forward ends of the feet to provide support for the lower end of the plate, and said intermediate supports comprising arms projecting forwardly from the upper ends of the feet and terminating in a plane parallel to a plane projected angularly from the centers of said recesses to the pivotal connections for the record holder.

References Cited in the file of this patent

UNITED STATES PATENTS 1,949,180 Rettich ---------------- Feb. 27, 1934

FOREIGN PATENTS 800,172 Great Britain ---------- Aug. 20, 1958